(12) United States Patent
Riley et al.

(10) Patent No.: US 12,045,654 B2
(45) Date of Patent: Jul. 23, 2024

(54) MEMORY MANAGEMENT THROUGH CONTROL OF DATA PROCESSING TASKS

(71) Applicant: Alteryx, Inc., Irvine, CA (US)

(72) Inventors: Adam David Riley, Orwell (GB); Christopher H. Kingsley, Longmont, CO (US); Sergii Maruda, Hostomel (UA); Kostiantyn Shpuryk, Kyiv (UA); Leonid Lysiuk, Kyiv (UA); Roman Savchenko, Kyiv (UA)

(73) Assignee: Alteryx, Inc., Irvine, CA (US)

( * ) Notice: Subject to any disclaimer, the term of this patent is extended or adjusted under 35 U.S.C. 154(b) by 443 days.

(21) Appl. No.: 17/171,595

(22) Filed: Feb. 9, 2021

(65) Prior Publication Data

US 2022/0253338 A1  Aug. 11, 2022

(51) Int. Cl.
*G06F 9/50* (2006.01)
(52) U.S. Cl.
CPC .................................. *G06F 9/5016* (2013.01)
(58) Field of Classification Search
CPC ...................................................... G06F 9/5016
See application file for complete search history.

(56) References Cited

U.S. PATENT DOCUMENTS

| | | | | |
|---|---|---|---|---|
| 8,359,595 B2 * | 1/2013 | Kaler | ................... | G06F 9/4843 718/103 |
| 9,569,255 B1 * | 2/2017 | Johnson | ................ | G06F 9/5038 |
| 2001/0051971 A1 * | 12/2001 | Kato | ......................... | G06F 8/45 718/102 |
| 2002/0133533 A1 * | 9/2002 | Czajkowski | .......... | G06F 9/5016 718/107 |
| 2005/0097556 A1 * | 5/2005 | Code | ..................... | G06F 9/4881 718/102 |
| 2005/0262324 A1 | 11/2005 | Mathiske | | |
| 2012/0222038 A1 | 8/2012 | Katragadda et al. | | |
| 2014/0089809 A1 * | 3/2014 | Levy | ..................... | G06F 3/0484 715/736 |
| 2014/0173198 A1 * | 6/2014 | Leong | ................... | G06F 3/0611 711/114 |

(Continued)

OTHER PUBLICATIONS

PCT International Search Report and Written Opinion, PCT Application No. PCT/US22/15653, Jun. 2, 2022, 14 pages.

*Primary Examiner* — Meng Ai T An
*Assistant Examiner* — Willy W Huaracha
(74) *Attorney, Agent, or Firm* — FIG. 1 Patents

(57) ABSTRACT

A module manages usage of a memory in a computer by scheduling data processing tasks. The module determines whether a memory associated with a computer is available for performing a data processing task. In response to determining that the memory is not available for performing the data processing task, the module generates a factory object for the data processing task. The factory object specifies instructions to produce the data processing task. After the factory object is generated, the module receives a request to perform the data processing task. The module produces the data processing task by using the factory object in response to the request and determine again whether the memory is available for performing the data processing task. In response to determining that the memory is now available for performing the data processing task, the module performs the data processing task by using the memory.

11 Claims, 6 Drawing Sheets

(56) References Cited

U.S. PATENT DOCUMENTS

2017/0371723 A1\* 12/2017 Chrysanthakopoulos ................... H04L 67/51
2019/0114085 A1\* 4/2019 Harding, Jr. ............ G06F 3/067

\* cited by examiner

MEMORY MANAGEMENT THROUGH CONTROL OF DATA PROCESSING TASKS

BACKGROUND

Field of Art

The described embodiments pertain in general to computer memory management, and in particular to managing memory usage through control of data processing tasks.

Description of the Related Art

The growth of data analytic platforms, such as Big Data Analytics, has expanded data processing into a tool for processing large volumes of data to extract information having business value. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

In addition, multiple data analytic processes can be performed concurrently to efficiently access, process, and analyze the large sets of data from differing data sources. In such a multiprocessing environment, it is essential for the data analytic platform to share available memory effectively among the processes. However, currently available data analytic platforms face the challenges of executing multiple data analytic processes. For instance, a conventional data analytic platform typically locks free memory space for a process and prevents that space from being used by other processes, even when the free space is actually not enough to run the process, causing inefficient memory usage. This can also cause excessive memory usage, particularly when a number of processes are running concurrently. Consequently, performance bottlenecks can occur and impede the function of the data analytics platform, delay the processing of the data, and reduce the quality of information extracted from the data.

SUMMARY

The above and other issues are addressed by a method, computer system, and computer-readable storage medium for managing memory in a computer. An embodiment of the method includes determining, at a first time, whether a memory associated with a computer is available for executing a data processing task. The method further includes in response to determining, at the first time, that the memory is not available for performing the data processing task, generating a factory object for the data processing task. The factory object specifies instructions to produce the data processing task. The method further includes after generating the factory object, receiving a request to perform the data processing task. The method further includes in response to the request, producing the data processing task by using the factory object. The method further includes determining, at a second time that is after the first time, that the memory is available for performing the data processing task. The method also includes performing the data processing task by using the memory.

An embodiment of the computer system includes a computer processor for executing computer program instructions. The system also includes a non-transitory computer-readable storage medium storing computer program instructions that when executed cause the computer processor to perform operations. The operations include determining, at a first time, whether a memory associated with a computer is available for executing a data processing task. The operations further include in response to determining, at the first time, that the memory is not available for performing the data processing task, generating a factory object for the data processing task. The factory object specifies instructions to produce the data processing task. The operations further include after generating the factory object, receiving a request to perform the data processing task. The method further includes in response to the request, producing the data processing task by using the factory object. The method further includes determining, at a second time that is after the first time, that the memory is available for performing the data processing task. The operations also include performing the data processing task by using the memory.

An embodiment of the non-transitory computer-readable memory stores executable computer program instructions. The instructions are executable to perform operations for determining, at a first time, whether a memory associated with a computer is available for executing a data processing task. The operations further include in response to determining, at the first time, that the memory is not available for performing the data processing task, generating a factory object for the data processing task. The factory object specifies instructions to produce the data processing task. The operations further include after generating the factory object, receiving a request to perform the data processing task. The method further includes in response to the request, producing the data processing task by using the factory object. The method further includes determining, at a second time that is after the first time, that the memory is available for performing the data processing task. The operations also include performing the data processing task by using the memory.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
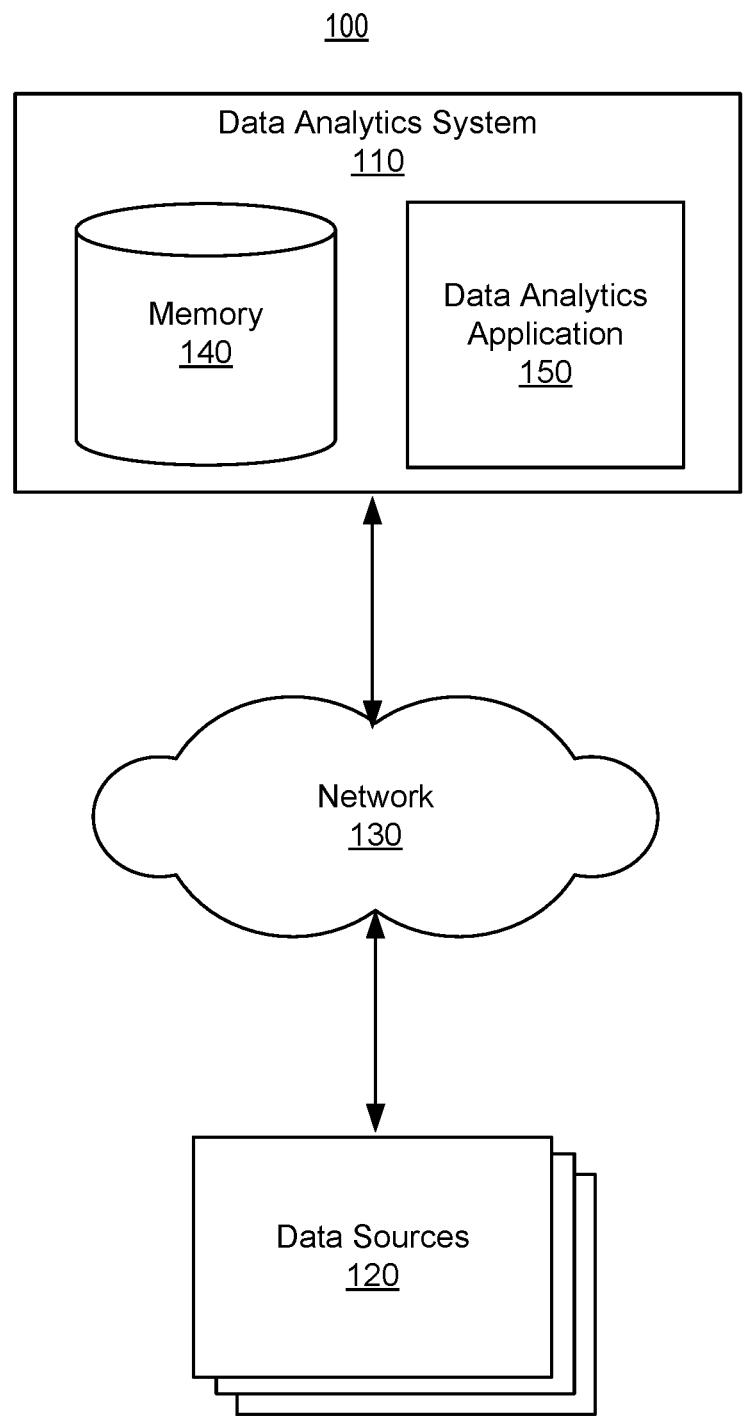
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data analytics system 110 is a computer-based system utilized for processing large amounts of data. The data are collected, gathered, or otherwise accessed from the multiple data sources 120 via the network 130. The data analytics system 110 can implement scalable software tools and hardware resources employed in data processing tasks from a wide variety of data sources. A data processing task (also referred to as a task) is a computing operation for processing data. A data processing task includes, e.g., accessing data, preparing data, blending data, packaging data, analyzing data, other types of operations on data, or some combination thereof. For instance, the data analytics system 110 supports the execution of data intensive processes and workflows, e.g., the workflow described below in conjunction with FIG. 2. The data analytics system 110 can be a computing device used to implement data analytics functions including the memory management techniques described herein. The data analytics system 110 can perform multiple tasks in parallel. When it has computer resources (e.g., memory) available, it can pick a task to perform from a plurality of tasks that are ready to be performed.

In the embodiment of FIG. 1, the data analytics system 110 includes a memory 140 and a data analytics application 150. The memory 140 stores data used in data analytic operations and provides access to data storage area(s). In some embodiments, the memory 140 includes random access memory (RAM), hard disk drive (HDD), solid-state drive (SSD), other forms of computer memory, or some combination thereof. Usage of the memory 140 is managed by data analytics application 150.

The data analytics application 150 is a software application performing data processing tasks in a manner that controls usage of the memory 140. For instance, after it receives a data processing task, the data analytics application 150, as opposed to directly locking a block of the memory 140 to store data for the data processing task, first determines whether the memory 140 is available for the data processing task, e.g., whether unreserved blocks of the memory 140 is sufficient to store the data of the task. In response to determining that the memory 140 is available, the data analytics application 150 then locks the memory block and performs the data processing task.

However, in situations where the data analytics application 150 determines that the unreserved blocks of the memory 140 are insufficient for performing the task, it holds off on performing the data processing task. In some embodiments, the data analytics application 150 generates a factory object that specifies instructions to produce the data processing task so that it can produce the task from the factory object later when it tries to perform the task next time. In some other embodiments, the data analytics application 150 places the data processing task into a queue of data processing tasks. The queue includes tasks that are not ready to be performed, e.g., due to lack of sufficient memory (and/or other types of needed computer resources), but can be performed when the memory becomes available. Given that memory blocks locked for other tasks can be released once those tasks are completed, the memory 140 can have enough free space for the task later. The data analytics application 150 will check later whether the memory becomes available for the data processing task and can retrieve the data processing task by using the factory object or from the queue and perform the data processing task when the memory becomes available.

By using the factory object or the queue, the data analytics application 150 does not need to allocate any memory blocks for inputting or reading of the data of the task before the task can be performed. This way, no memory block is locked until there is enough available memory to perform the task. The data analytics application 150 can use the memory block, the locking of which is avoided, to perform other data processing tasks. For instance, in a situation where the memory has only 400 MB free space but 600 MB is needed to perform the task, conventional data analytic platforms typically lock a memory block of 400 MB for the task anyway and wait till another 200 MB becomes available to perform the task. The 400 MB is "wasted" during the time of waiting. Different from the conventional data analytic platforms, the data analytics application 150 does not lock the 400 MB. Rather, it uses the 400 MB to perform other data processing tasks that requires no more than 400 MB while it is waiting for the memory to have enough free space for the task. Thus, the memory management technique implemented by the data analytics application 150 optimizes usage of the memory 140 and improves data processing efficiency.

The memory management technique implemented by the data analytics application 150 also avoids the situation where multiple data processing tasks lock memory concurrently and therefore, prevents excessive usage of the memory 140. Also, as the factory object may have a memory footprint that is smaller than a memory footprint of the task, the data analytics application 150 further improves memory usage by storing the factory object, as opposed to the task itself, in the memory 140. Thus, the data analytics application 150 provides a more advantageous memory management technique than the conventional data analytic platforms.

In some embodiments, the memory 140 includes a primary memory 140 providing relatively fast access to a relatively small data storage area and a secondary memory 150 providing relatively slow access to a relatively large data storage area. The data analytics application 150 manages usage of the primary and secondary memories to provide efficient data processing.

In some cases, the data analytics application 150 provides software that supports networked, or cloud-based, access to data analytic tools and macros to multiple end users. As an example, the data analytics application 150 allows users to share, browse and consume analytics in a manner similar to a mobile application store or other cloud-based service. Analytic data, macros and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 150 can perform functions associated with analytic apps such as creating, deploying, publishing, iterating, updating and the like.

Additionally, the data analytics application 150 can support functions performed at various stages involved in data analytics, such as the ability to access, prepare, blend, analyze, and output analytic results. In some cases, the data analytics application 150 can access the various data sources, retrieving raw data, for example, in a stream of data. Data streams collected by the data analytics application 150 can include multiple records of raw data, where the raw data is in differing formats and structures. After receiving at least one data stream, the data analytics application 150 can perform operations to allow records of the data stream to be used as an input into data analytic operations. Moreover, analytic functions involved in statistical, qualitative, or quantitative processing of records, such as predictive analytics (e.g., predictive modelling, clustering, data investigation) can be implemented by data analytics application 150.

The data analytics application 150 can also support a software tool to design and execute repeatable workflows, via a visual graphical user interface (GUI). As an example, a GUI associated with the data analytics application 150 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 2.

As mentioned above, the data sources 120 provide electronic data to the data analytics system 110. A data source 120 may be a computer, a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130. The data provided the data sources 120 is typically organized into data records, which each data record including one or more values. For example, a data record provided by a data source may include a series of comma-separated values. The data describes information of relevance to an enterprise using the data analytics system. For example, data from a data source 120 can describe computer-based interactions (e.g., click tracking data) with content accessible on websites and/or with social media applications.

The network 130 represents the communication pathways between the data analytics system 110 and the data sources 120. In one embodiment, the network 130 is the Internet and uses standard communications technologies and/or protocols. The data exchanged over the network 130 can be represented using technologies and/or formats including the hypertext markup language (HTML), the extensible markup language (XML), etc. In another embodiment, the entities can use custom and/or dedicated data communications technologies instead of, or in addition to, the ones described above.

Figure 2:
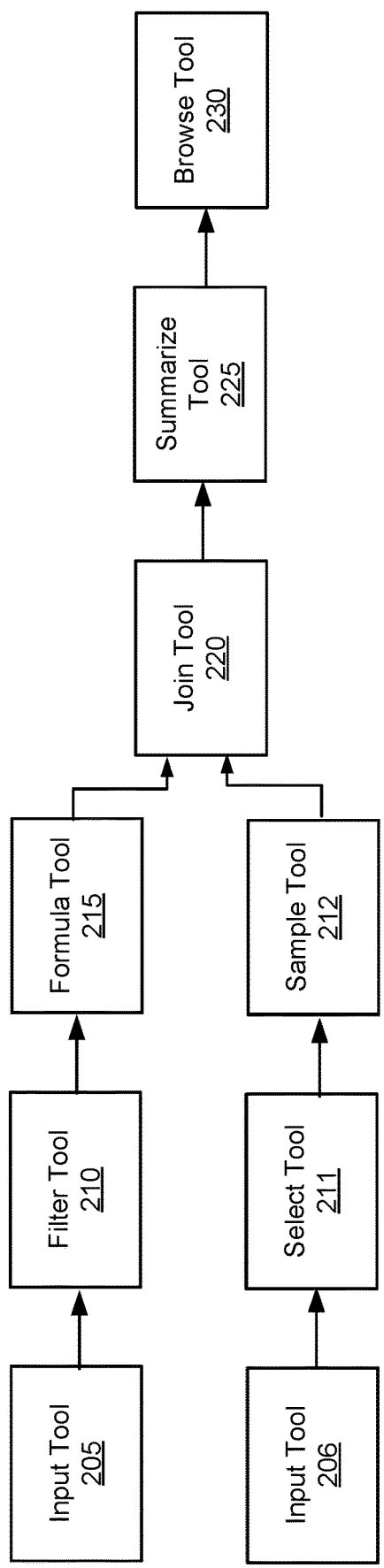
FIG. 2 is a block diagram illustrating a workflow created using the data analytics system to process data according to one embodiment.

FIG. 2 is a block diagram illustrating a workflow 200 created using the data analytics system 110 to process data according to one embodiment. In one embodiment, the workflow 200 is created using a visual workflow environment supported by a GUI of the data analytics system 110. The visual workflow environment enables a set of drag and drop tools that eliminate the need of providing software code to design a workflow and eliminate the need to identify complex formulas to be implemented by a workflow. In another embodiment, the workflow 200 is created and described in a document, such as an extensible markup language (XML) document. The workflow 200 is executed by a computer device of the data analytics system 110. However, in other embodiments, the workflow 200 is deployed to another computer device that may be communicatively connected, via a network (e.g., the network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A record, including an aggregated group of individual records, can be passed through the tools of a workflow, which allows for the individual processing operations to operate more efficiently on the data. Such data aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools can execute in parallel.

As illustrated, the workflow 200 of FIG. 2 includes input/output tools, illustrated as input tools 205 and 206 and browse tool 230. The input tools 205 and 206 function to access records from particular data sources 120. The inputs tools 205 and 206 bring into the workflow the accessed records and provide the records to the subsequent tools of the workflow 200. In this example, the input tool 205 provides accessed records to a filter tool 210 and the input tool 206 provides accessed records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparations tools, shown as the filter tool 210, the select tool 211, a formula tool 215, and a sample tool 212. The filter tool 210 queries records based on an expression and splits the data into two streams, a true stream that includes records that satisfy the expression and a false stream that includes records that do not satisfy the expression. The select tool 211 can be used to select, deselect, reorder and rename fields, change field type or size, and assign a description. The formula tool 215 creates or updates fields using one or more expressions to perform a broad variety of calculations and/or operations. The sample tool 212 limits a received stream of records to a number, percentage, or random set of records.

The workflow 200 also includes a join tool 220 that blends multiple data sources. Specifically, the join tool 220 combines two input data streams based on common fields (or record position). The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass records one at a time through the filter tool 210 and the formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 can possess the capability to implement their own parallel operation, such as initiating a read of a block of data while processing the last block of data or breaking computer-intensive operations, such as a sort tool, into multiple parts. However, in some existing workflow techniques, each record from a set of records is individually processed by each tool of the workflow one record at a time, in a pipeline fashion, until a tool in the workflow is reached that requires multiple records to perform the processing operation (e.g., sort tool, join tool, summarize tool, etc.).

Figure 3:
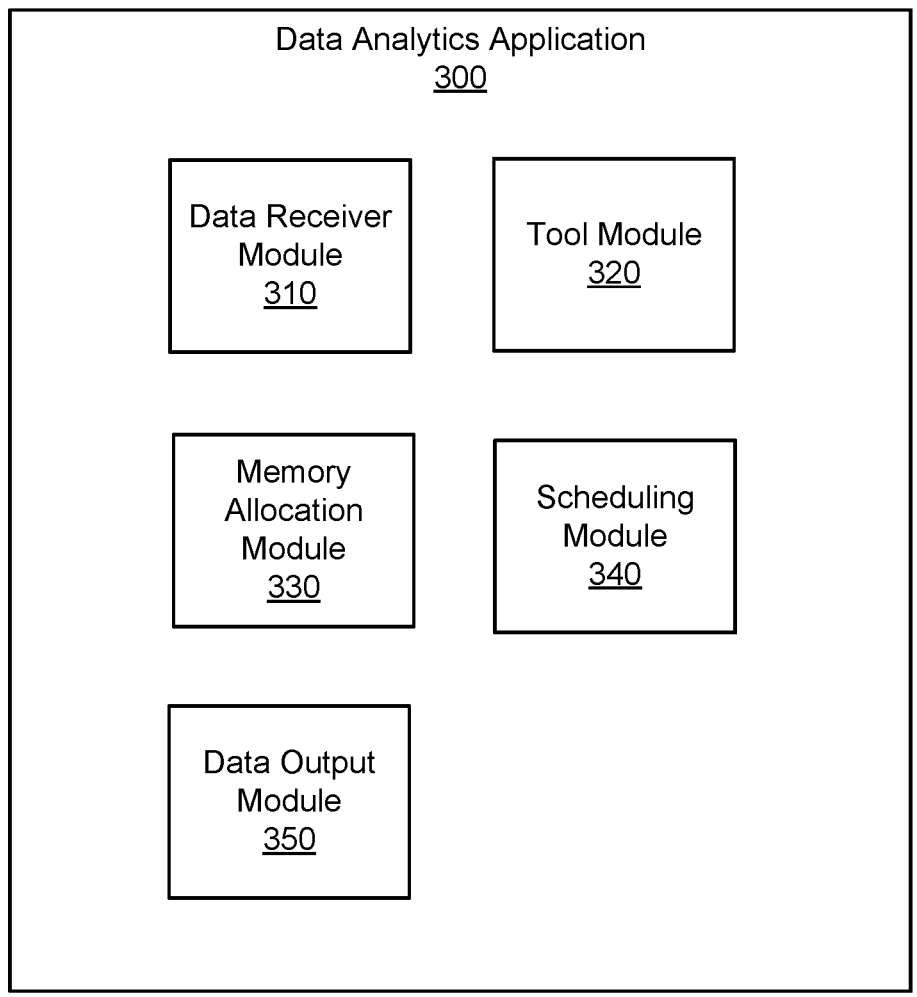
FIG. 3 is a block diagram illustrating a data analytics application according to one embodiment.

FIG. 3 is a block diagram illustrating a data analytics application 300 according to one embodiment. The data analytics application 300 provides efficient data processing and memory management according to a specified workflow. The data analytics application 300 is an embodiment of the data analytics application 150 in FIG. 1. In the embodiment of FIG. 3, the data analytics application 300 includes a data receiver module 310, tool module 320, a memory allocation module 330, a scheduling module 340, and a data serving module 350. Those of skill in the art will recognize that other embodiments can have different and/or other components than the ones described here, and that the functionalities can be distributed among the components in a different manner.

The data receiver module 310 receives the data records from data sources, e.g., the data sources 120, and provides the data records to other modules in the data analytics application 300. In one embodiment, the data receiver module 310 serves as the interface between the tools in the data analytics application, such as the input tools 206 illustrated in FIG. 2. In another embodiment, the data receiver module 310 is absent and the function of the data receiver module 310 is performed by the tools.

The tool module 320 provides a set of data processing tools (also referred to as tools) that perform specific data processing tasks in the workflow. The tools operate on the data records received from the data sources by the data receiver module 310. In some embodiments, the tool module 320 provide the tools included in the workflow 200 described in conjunction with FIG. 2. One or more tools of the tool module 320 may execute in parallel while processing data records for a workflow. A tool may run as multiple separate threads, with each thread operating on a separate core of the processor 302. For example, an embodiment of the join tool distributes tasks associated with the join operation to multiple threads to leverage the parallel processing capabilities of the processor 302. A tool creates tasks to execute its operations. An operation of a tool includes one or more tasks. Each task is assigned to a thread of the tool for being performed by the thread. In some embodiments, a tool requests for memory needed for an operation before it creates the tasks of the operation. The requested memory can be allocated to the tool by the memory allocation module 330. The allocated memory can be shared by the threads to perform the tasks.

A thread, to which a task is assigned, interacts with other modules of the data analytics application 150 to perform a task. In some embodiments, the thread sends a memory availability request to the memory allocation module 330 to query whether there is enough memory available for performing the task. In one embodiment, the memory availability request specifies an amount of memory that is required for performing the task ("required memory"). The amount of required memory can be determined by the thread or be received by the thread when the task is assigned to the thread.

The thread receives a memory availability response from the memory allocation module 330. The memory availability response includes information indicating whether there is enough memory available for the task. In some embodiments, the thread determines whether the memory is available to perform the task based on the memory availability response. For instance, the memory availability response specifies the amount of available memory. In one embodiment, the thread compares the amount of available memory in the memory availability response with the amount of required memory. The thread determines that there is enough memory available if the comparison shows that the amount of available memory is no less than the amount of required memory. Otherwise, the thread determines that the memory is not available for the task.

In another embodiment, even after the thread determines that the amount of available memory is less than the amount of required memory, the thread determines an amount of memory required for performing a reduced scope of the task and the amount of available memory with the amount of memory required for performing the reduced scope of the task. If the comparison shows that the amount of memory required for performing the reduced scope of the task is less than the amount of available memory, the thread determines that there is enough memory available.

In situations where there is enough memory available, the thread sends a memory allocation request to the memory allocation module 330 to request the memory allocation module 330 to allocate the required memory to the task. The thread also sends a scheduling request to the scheduling module 340 to schedule its performance of the task. Then the thread performs the task as scheduled with the allocated memory and requests the memory allocation module 330 to release the allocated memory (e.g., by sending a memory release request to the memory allocation module 330) after it completes the task.

In situations where there is not enough memory available, the thread generates a factory object for the task and registers the factory object with the scheduling module 320. Alternatively, the thread places the task in a queue of data processing tasks that is maintained by the scheduling module 340. After that, the thread becomes free to perform other tasks.

As a time window passes, a thread (maybe the same thread or a different thread) receives a request, e.g., from the scheduling module 340, to perform the task. In response to the request, the thread produces the task from the task factory and tries, for the second time, to perform the task. The thread sends another memory availability request to the memory allocation module 330 and determines, for the second time, whether the memory is available for the task.

The memory may have become available during the time window, because memory used for other data processing tasks may have been released as these tasks were finished during the time window. In that case, the thread will execute the process of performing the task as described above, i.e., request memory allocation, request scheduling of the task, perform the task, and release the memory after it finishes the task. However, if the memory is still unavailable, the thread will request the scheduling module 340 to keep the task in the queue.

The memory allocation module 330 manages memory usage by the tool module 320. The memory allocation module 330 receives memory availability requests from the tool module 320 within the data analytics application 150. The memory availability request may be received, for example, from tools of the tool module 320 while the tools are processing the workflow. In response to such a memory availability request, the memory allocation module 330 determines an amount of memory that is available to reserve for the corresponding task. In some embodiments, the available memory is memory that has not been reserved for other data processing tasks. The memory allocation module 330 compares the amount of required memory with the amount of available memory. After it determines that the amount of required memory is more than the amount of available memory, the memory allocation module 330 generates a memory availability response indicating that it does not have memory available for the task, versus a memory availability response indicating that it has memory available for the task after it determines that the amount of required memory is no more than the amount of available memory. The memory allocation module 330 sends the memory availability response to the tool module 320.

The memory allocation module 330 also allocates and releases memory for storing data records being processed by the tools of the tool module 320 as the tools implement a workflow. In some embodiments, the memory allocation module 330 receives memory allocation requests from tools of the tool module 320 to reserve blocks of memory. In response to such a memory allocation request, the memory allocation module allocates a logical contiguous block of memory and returns a handle to the block of memory to the requesting tool so that the block is locked by the requesting tool and becomes unavailable to other tools. In some embodiments, the memory allocation request specifies a block size and the memory allocation module 330 allocates the block based on the block size.

The memory allocation module 330 also receives memory release requests that specify handles to blocks of memory. The memory allocation module 330 releases such memory blocks so that the blocks are available to be reallocated in subsequent requests. The memory allocation module 330 keeps a list of free blocks that are available to be reallocated.

In one embodiment, the memory allocation module 330 is dedicated to the data analytics application 150. The memory allocation module 330 may separately interface with memory management functionality provided by the data analytics system 110. For example, the memory allocation module 330 may interface with a different memory management system provided by an operating system running on the data analytics system 110. The memory allocation module 330 abstracts the memory operations of the data analytics application 150 away from the operating system memory management system.

The scheduling module 340 interacts with the tool module 320 to schedule performance of data processing tasks by the tool module 320. In one example, the tools of the tool module 320 create tasks and communicate with the scheduling module 340 to schedule performance of the tasks. A tool can schedule tasks directly with the scheduling module 340 and/or register tasks as factory objects with the scheduling module 340 for the scheduling module 340 to query for tasks. In another example, the scheduling module 340 monitors the threads of the tools and detects threads free to perform tasks ("free threads"). A free thread may be an idle thread that is not performing any data processing tasks and therefore, is available to take new tasks. In response to detection of a free thread, the scheduling module 340 queries for a task.

In some embodiments, the scheduling module 340 queries for a task by requesting a registered factory object to produce a task. The scheduling module 340 may receive a response from the factory object that it cannot produce any task that is ready to be performed (i.e., there is sufficient memory to perform the task), or a response that it can produce a ready task. In some other embodiments, the scheduling module 340 queries for a task by checking the queue and determine if any task in the queue is ready to be performed. In response to that a task (either from the factory object or from the queue) is ready to be performed, the scheduling module 340 assigns the task to the free thread and schedules performance of the task by the thread. The scheduling module 340 may also schedule future tasks with the thread.

The data output module 350 outputs the results of the processing performed by the data analytics application 150. That is, the data output module 350 receives the processed data records produced by execution of the workflow 200 and makes the data records available to other systems and/or human reviewers. For example, the data output module 350 may provide a GUI by which a human reviewer associated with an enterprise can review the output of the workflow 200 resulting from processing data records associated with the enterprise.

Figure 4:
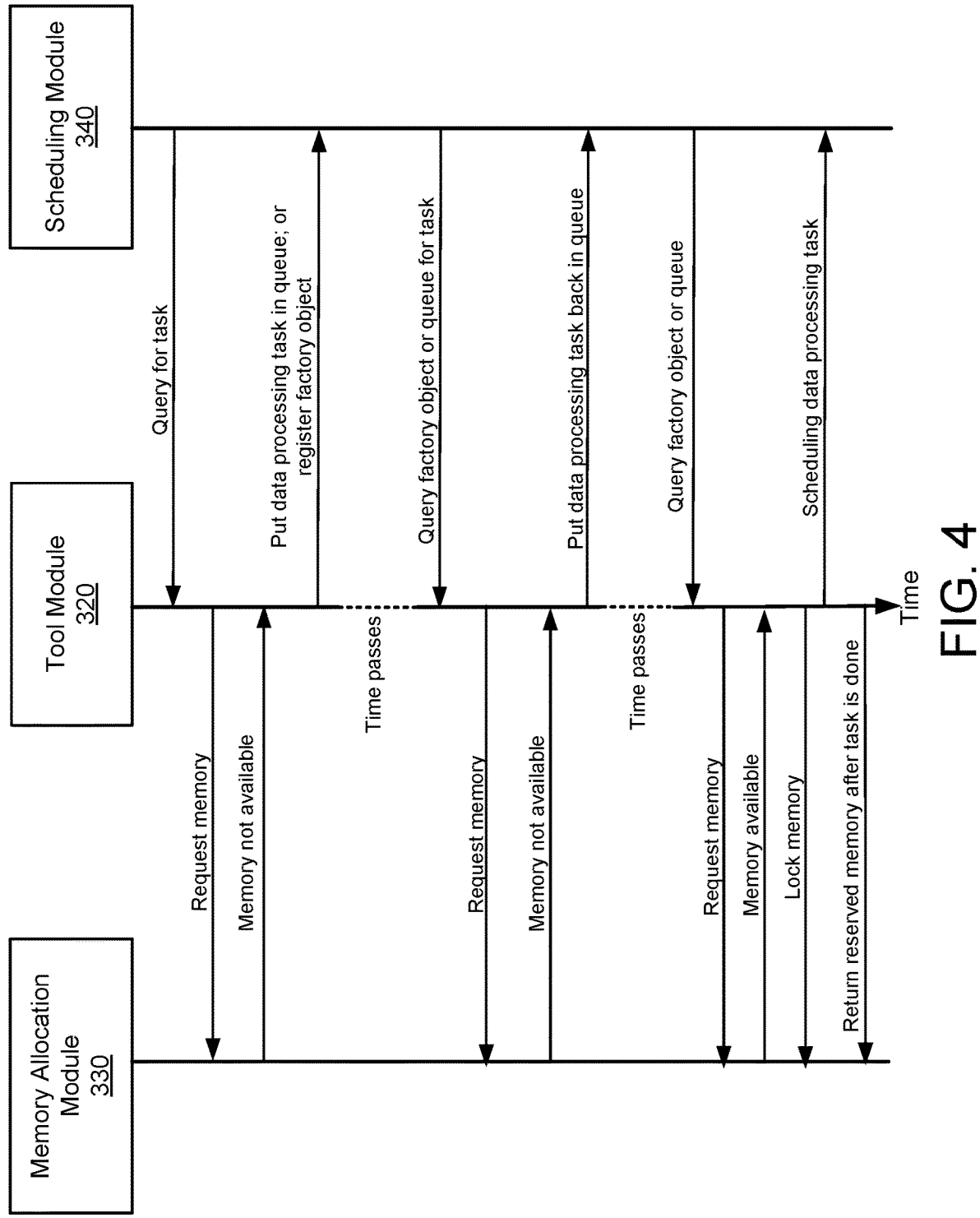
FIG. 4 is a schematic diagram illustrating a process of managing memory usage through control of data processing tasks according to one embodiment.

FIG. 4 is a schematic diagram illustrating a process of managing memory usage by scheduling data processing tasks according to one embodiment. The process is performed by the memory allocation module 330, tool module 320, and the scheduling module 340. FIG. 4 illustrates various actions of the three modules in the course of performing a data processing task.

The process starts with the scheduling module 340 queries for task, e.g., by requesting the tool module 320 to produce a task. In response to the request, the tool module 320 produces that task. The tool module 320 also requests memory using the memory allocation module 330, e.g., by sending a memory availability request to the memory allocation module 330. The tool module 320 may determine an amount of memory required for performing the task and include the amount in the memory availability request.

The memory allocation module 330 sends a response to the tool module 320 indicating that the memory is not available for performing the task. The response may be generated based on a determination that the amount of memory that has not been locked for performing other tasks is less than the amount of memory that is required for performing this task. After receiving the response from the memory allocation module 330, the tool module 320 determines not to perform the task. Rather, it puts the task in a queue or registers a factory object with the scheduling module 340 so that the task can be produced from the factory object for being performed later. The scheduling module 340 will try to have the task performed when required memory becomes available.

After a duration of time passes, the scheduling module 340 queries the factory object or the queue for a task. For instance, the scheduling module 340 determines that a thread is free to perform a task and in response to the determinization, queries the factory object or the queue. After the task is produced from the factory object or retrieved from the queue, the scheduling module 340 assigns the task to the free thread. The tool module 320, after receiving the request, produces the task from the factory object and requests memory with the memory allocation module 330 again. The response from the memory allocation module 330 this time is also that the memory is not available. Once again, the tool module 320 determines not to perform the task. In embodiments where the task is retrieved from the queue, the task is put back into the queue.

After another duration of time passes, the scheduling module 340 identifies a free thread (may be the same or a different thread from the free thread in the last time) requests for a task again. Similar to the last time, the scheduling module 340 assigns the task (from either the factory object or the queue) to the free thread, which requests memory with the memory allocation module 330. This time, the tool module 320 receives from the memory allocation module 330 a response that the memory is available for performing the task. Based on the response, the tool module 320 requests the memory allocation module 330 to lock a block of the memory for the task and requests the scheduling module 320 to schedule the task. In response to the requests from the tool module, the memory allocation module 330 reserves the memory block for the task so that the memory block is locked and cannot be used to perform other task, and the scheduling module 320 schedules performance of the task and removes the task from the queue. The tool module 320 performs with the task as scheduled with the locked memory block and releases the locked memory block after it completes the task.

Figure 5:
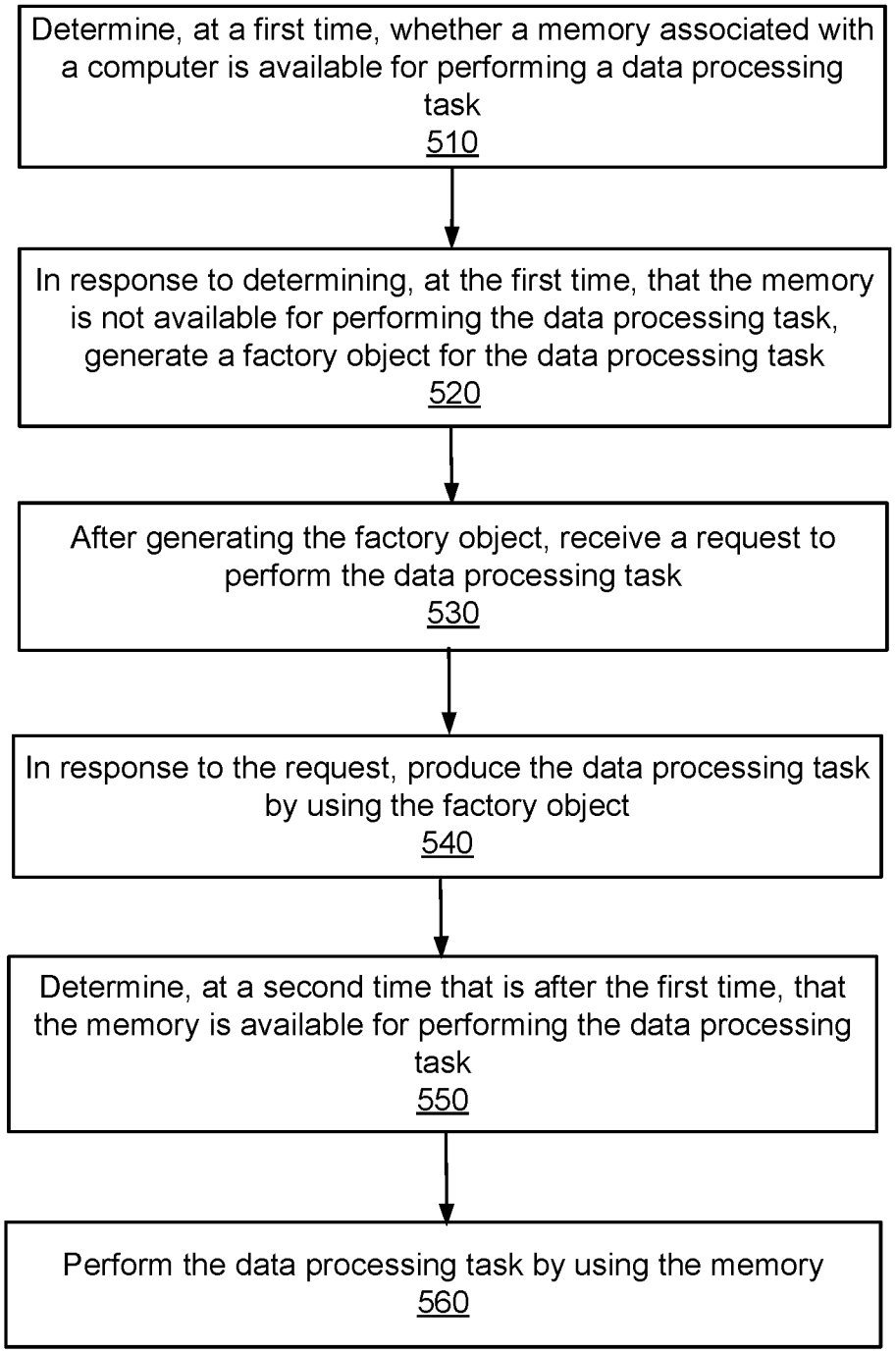
FIG. 5 is a flow chart illustrating a process of managing memory usage through control of data processing tasks according to one embodiment.

FIG. 5 is a flow chart illustrating a process of manage usage of memory by scheduling data processing tasks according to one embodiment. In some embodiments, the method is performed by the data analytics application 150, although some or all of the operations in the method may be performed by other entities in other embodiments. In some embodiments, the operations in the flow chart are performed in a different order and can include different and/or additional steps.

The data analytics application 150 determines, at a first time, whether a memory associated with a computer is available for performing a data processing task. In some embodiments, the data analytics application 150 determines an amount of memory required for performing the data processing task. The data analytics application 150 also determines an amount of memory that has not been reserved for other data processing tasks. Then the data analytics application 150 determines whether the amount of memory required for performing the data processing task is more than the amount of memory that has not been reserved for other data processing tasks. In response to determining that the amount of memory required for performing the data processing task is more than the amount of memory that has not been reserved for other data processing tasks, the data analytics application 150 determines that the memory is not available for performing the data processing task.

In some embodiments, in response to determining, at the first time, that the memory is not available for performing the data processing task, the data analytics application 150 places the data processing task into a queue of data processing tasks. The data analytics application 150 can later retrieve the task from the queue and perform the task after the memory becomes available for the task.

The data analytics application 150 generates a factory object for the data processing task in response to determining, at the first time, that the memory is not available for performing the data processing task. The factory object specifies instructions to produce the data processing task. In some embodiments, the factory object comprises program instructions that when executed, cause a computer processor to produce the data processing task. The factory object is stored in the memory. The factory object may have a memory footprint smaller than a memory footprint of the data processing task.

After generating the factory object, the data analytics application 150 receives a request to perform the data processing task. In some embodiments, the data analytics application 150 receives the request after a predetermined amount of time passes since it determined, at the first time, that the memory is not available. In some other embodiments, the data analytics application 150 receives the request in response to a detection that the data analytics application 150 has a tool that is available to perform the task.

In response to the request, the data analytics application 150 produces the data processing task by using the factory object, e.g., by executing the program instructions in the factory object. The data analytics application 150 determines at a second time that is after the first time, that the memory is available for performing the data processing task. In some embodiments, the data analytics application 150 determines an amount of memory required for performing the data processing task and an amount of memory that has not been reserved for other data processing tasks. Then the data analytics application 150 determines whether the amount of memory required for performing the data processing task is more than the amount of memory that has not been reserved for other data processing tasks. In response to determining that the amount of memory required for performing the data processing task is more than the amount of memory that has not been reserved for other data processing tasks, the data analytics application 150 determines an amount of memory required for performing a reduced scope of the data processing task. The data analytics application 150 determining whether the amount of memory required for performing the reduced scope of the data processing task is no more than the amount of memory that has not been reserved for other data processing tasks. In response to determining that the amount of memory required for performing the reduced scope of the data processing task is no more than the amount of memory that has not been reserved for other data processing tasks, the data analytics application 150 determines that the memory is available for performing the data processing task.

In some embodiments, in response to determining, at the second time, that the memory is available for performing the data processing task, the data analytics application 150 schedules the task and removes the task from the queue.

In some embodiments, the data analytics application 150 determines, at a third time, whether the memory is available for performing the data processing task. The third time is after the first time but before the second time. In response to determining, at the third time, that the memory is not available for performing the data processing task, the data analytics application 150 requests the scheduling module 330 to place the data processing task back into the queue The data analytics application 150 performs the data processing task by using the memory. After the data analytics application 150 completes the task, it releases the memory.

Figure 6:
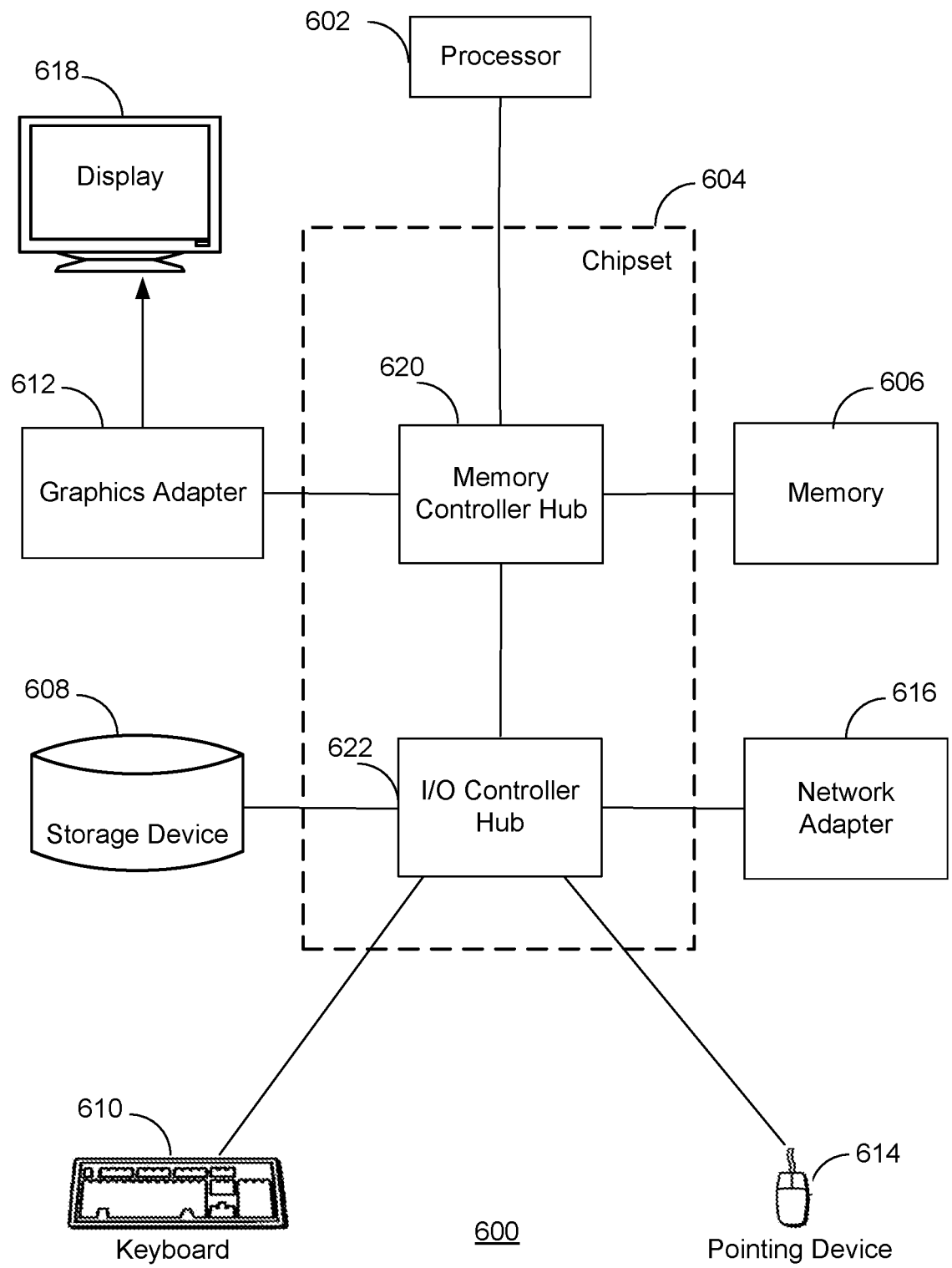
FIG. 6 is a high-level block diagram illustrating a functional view of a typical computer system for use as the data analytics system of FIG. 1 according to one embodiment.

FIG. 6 is a high-level block diagram illustrating a functional view of a typical computer system 600 for use as the machine learning server 110 of FIG. 1 according to an embodiment.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently. For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 160.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method for managing memory usage in a data analytics environment including a data analytics system connected to data sources, comprising:

accessing, by a computer system of the data analytics system, an analytics workflow comprising a sequence of tools, each tool in the sequence adapted to perform a data analytics function of a plurality of data analytics functions of the analytics workflow;

determining, at a tool of the sequence of tools in the analytics workflow at a first time, whether an amount of available memory associated with the computer system is sufficient for storing data records for performing a data processing task received from the data sources;

in response to determining, at the first time, that the amount of available memory is not sufficient for storing the data records for performing the data processing task, generating a factory object for the data processing task, the factory object specifying instructions to produce the data processing task and has a memory footprint that is smaller than a memory footprint of the data processing task;

registering, by the tool, the factory object with a scheduler of the data analytics system;

in response to detection of a free thread associated with the tool by the scheduler, requesting a data processing task from the factory object;

in response to the request, producing the data processing task by using the factory object;

determining, at a second time that is after the first time, that an amount available memory is sufficient for performing a reduced scope of the data processing task and scheduling the reduced scope of the data processing task with the scheduler, the determining comprising:

determining that an amount of memory required for performing the data processing task is more than the amount of available memory, determining a smaller amount of memory required for performing the reduced scope of the data processing task, determining that the smaller amount of memory required for the reduced scope of the data processing task is smaller than the amount of available memory, and scheduling the reduced scope of the data processing task with the scheduler; and in response to the scheduling, storing the data records using the amount of available memory and performing, by the computer system, the reduced scope of the data processing task to process the data records.

2. The computer-implemented method of claim 1, further comprising:

in response to determining, at the first time, that the amount of available memory is not sufficient for storing the data records for performing the data processing task, alternatively placing the data processing task into a queue of data processing tasks; and in response to determining, at the second time, that the amount of available memory is sufficient for performing a reduced scope of the data processing task, removing the data processing task from the queue of data processing tasks.

3. The computer-implemented method of claim 2, further comprising:

determining, at a third time that falls between the first time and the second time, whether the amount of available memory is sufficient for performing the data processing task; and in response to determining, at the third time, that the amount of available memory is not sufficient for performing the data processing task;

placing the data processing task back into the queue.

4. The computer-implemented method of claim 1, wherein determining, at the first time, that the amount of available memory is not sufficient for storing the data records for performing the data processing task comprises:

determining the amount of memory required for performing the data processing task;

determining an amount of memory that has not been reserved for other data processing tasks;

determining whether the amount of memory required for performing the data processing task is more than the amount of memory that has not been reserved for other data processing tasks; and in response to determining that the amount of memory required for performing the data processing task is more than the amount of memory that has not been reserved for other data processing tasks, determining that the amount of available memory is not sufficient for performing the data processing task.

5. A computer system for managing memory usage in a data analytics environment including a data analytics system connected to data sources, the computer system comprising:

a computer processor; and a non-transitory computer-readable storage medium storing executable computer program instructions, the computer program instructions comprising instructions that when executed cause the computer processor to perform operations comprising:

accessing an analytics workflow comprising a sequence of tools, each tool in the sequence adapted to perform a data analytics function of a plurality of data analytics functions of the analytics workflow;

determining, at a tool of the sequence of tools in the analytics workflow at a first time, whether an amount of available memory associated with the computer system is sufficient for storing data records for performing a data processing task received from the data sources;

in response to determining, at the first time, that the amount of available memory is not sufficient for storing the data records for performing the data processing task, generating a factory object for the data processing task, the factory object specifying instructions to produce the data processing task and has a memory footprint that is smaller than a memory footprint of the data processing task;

registering, by the tool, the factory object with a scheduler of the data analytics system;

in response to detection of a free thread associated with the tool by the scheduler, requesting a data processing task from the factory object;

in response to the request, producing the data processing task by using the factory object;

determining, at a second time that is after the first time, that an amount available memory is sufficient for performing a reduced scope of the data processing task and scheduling the reduced scope of the data processing task with the scheduler, the determining comprising:

determining that an amount of memory required for storing the data records of the data processing task is more than an amount of available memory, determining a smaller amount of memory required for performing the reduced scope of the data processing task, determining that the smaller amount of memory required for the reduced scope of the data processing task is smaller than the amount of available memory, and scheduling the reduced scope of the data processing task with the scheduler; and in response to the scheduling, storing the data records using the amount of available and performing the reduced scope of the data processing task to process the data records.

6. The computer system of claim 5, wherein the operations further comprise:

in response to determining, at the first time, that the amount of available memory is not sufficient for storing the data records for performing the data processing task, alternatively placing the data processing task into a queue of data processing tasks; and in response to determining, at the second time, that the amount of available memory is sufficient for performing a reduced scope of the data processing task, removing the data processing task from the queue of data processing tasks.

7. The computer system of claim 6, wherein the operations further comprise:

determining, at a third time that falls between the first time and the second time, whether the amount of available memory is sufficient for performing the data processing task; and in response to determining, at the third time, that the amount of available memory is not sufficient for performing the data processing task;

placing the data processing task back into the queue.

8. The computer system of claim 5, wherein determining, at the first time, that the amount of available memory is not sufficient for storing the data records for performing the data processing task comprises:
   determining the amount of memory required for performing the data processing task;
   determining an amount of memory that has not been reserved for other data processing tasks;
   determining whether the amount of memory required for performing the data processing
   task is more than the amount of memory that has not been reserved for other data processing tasks; and
   in response to determining that the amount of memory required for performing the data
   processing task is more than the amount of memory that has not been reserved for other data processing tasks, determining that the amount of available memory is not sufficient for performing the data processing task.

9. A non-transitory computer readable storage medium storing executable computer program instructions for managing memory usage in a data analytics environment including a data analytics system connected to data sources, the computer program instructions comprising instructions that when executed cause a computer processor to perform operations comprising:
   accessing an analytics workflow comprising a sequence of tools, each tool in the sequence adapted to perform a data analytics function of a plurality of data analytics functions of the analytics workflow;
   determining, at a tool of the sequence of tools in the analytics workflow at a first time, whether an amount of available memory associated with a computer is sufficient for storing data records for performing a data processing task received from the data sources;
   in response to determining, at the first time, that the amount of available memory is not sufficient for storing the data records for performing the data processing task, generating a factory object for the data processing task, the factory object specifying instructions to produce the data processing task and has a memory footprint that is smaller than a memory footprint of the data processing task;
   registering, by the tool, the factory object with a scheduler of the data analytics system;
   in response to detection of a free thread associated with the tool by the scheduler, requesting a data processing task from the factory object;
   in response to the request, producing the data processing task by using the factory object;
   determining, at a second time that is after the first time, that an amount available memory is sufficient for performing a reduced scope of the data processing task and scheduling the reduced scope of the data processing task with the scheduler, the determining comprising:
      determining that an amount of memory required for storing the data records of the data processing task is more than an amount of available memory,
      determining a smaller amount of memory required for performing the reduced scope of the data processing task,
      determining that the smaller amount of memory required for the reduced scope of the data processing task is smaller than the amount of memory available, and
      scheduling the reduced scope of the data processing task with the scheduler; and
   in response to the scheduling, storing the data records using the amount of available and performing the reduced scope of the data processing task to process the data records.

10. The non-transitory computer readable storage medium of claim 9, wherein the operations further comprise:
    in response to determining, at the first time, that the amount of available memory is not sufficient for storing the data records for performing the data processing task, alternatively placing the data processing task into a queue of data processing tasks; and
    in response to determining, at the second time, that the amount of available memory is sufficient for performing a reduced scope of the data processing task, removing the data processing task from the queue of data processing tasks.

11. The non-transitory computer readable storage medium of claim 9, wherein determining, at the first time, that the amount of available memory is not sufficient for storing the data records for performing the data processing task comprises:
    determining the amount of memory required for performing the data processing task;
    determining an amount of memory that has not been reserved for other data processing tasks;
    determining whether the amount of memory required for performing the data processing task is more than the amount of memory that has not been reserved for other data processing tasks; and
    in response to determining that the amount of memory required for performing the data processing task is more than the amount of memory that has not been reserved for other data processing tasks, determining that the amount of available memory is not sufficient for performing the data processing task.

* * * * *